United States Patent
Bissantz (10) Patent No.: US 9,423,921 B2
(45) Date of Patent: Aug. 23, 2016

(54) SYSTEM FOR PROVIDING INFORMATION TO A USER

(71) Applicant: Nicolas Bissantz, Nürnberg (DE)

(72) Inventor: Nicolas Bissantz, Nürnberg (DE)

( * ) Notice: Subject to any disclaimer, the term of this patent is extended or adjusted under 35 U.S.C. 154(b) by 326 days.

(21) Appl. No.: 13/927,971

(22) Filed: Jun. 26, 2013

(65) Prior Publication Data

US 2015/0007091 A1    Jan. 1, 2015

(51) Int. Cl.
  *G06F 3/00*    (2006.01)
  *G06F 3/048*   (2013.01)
  *G06F 3/0481*  (2013.01)
  *G06Q 10/06*   (2012.01)

(52) U.S. Cl.
  CPC ............. *G06F 3/0481* (2013.01); *G06Q 10/06* (2013.01)

(58) Field of Classification Search
  None
  See application file for complete search history.

(56) References Cited

U.S. PATENT DOCUMENTS

| | | | |
|---|---|---|---|
| 6,243,105 B1 * | 6/2001 | Hoyer et al. | 345/440 |
| 6,564,342 B2 * | 5/2003 | Landan | 714/48 |
| 7,146,374 B1 * | 12/2006 | Molesky | |
| 7,458,033 B2 * | 11/2008 | Bacigalupi et al. | 715/772 |
| 7,739,148 B2 * | 6/2010 | Suzuki et al. | 705/7.39 |
| 7,861,148 B2 | 12/2010 | Bissantz | |
| 8,041,588 B2 * | 10/2011 | Gilbert et al. | 705/7.11 |
| 8,094,905 B2 | 1/2012 | Bissantz | |
| 8,122,369 B2 | 2/2012 | Bissantz | |
| 8,442,936 B2 | 5/2013 | Bissantz | |
| 8,466,918 B2 | 6/2013 | Steinstraesser | |
| 8,589,536 B2 * | 11/2013 | Karenos et al. | 709/224 |
| 8,593,461 B2 | 11/2013 | Bissantz | |
| 8,812,957 B2 * | 8/2014 | Error | 715/734 |
| 2002/0059294 A1 * | 5/2002 | Bottarelli et al. | 707/104.1 |
| 2004/0032420 A1 * | 2/2004 | Allen et al. | 345/700 |
| 2008/0117213 A1 * | 5/2008 | Cirit et al. | 345/440 |
| 2008/0186315 A1 | 8/2008 | Bissantz | |
| 2010/0005008 A1 * | 1/2010 | Duncker et al. | 705/27 |
| 2013/0246428 A1 | 9/2013 | Bissantz | |
| 2014/0164285 A1 * | 6/2014 | Ashburn et al. | 705/36 R |
| 2014/0176555 A1 * | 6/2014 | Kuo | G06T 11/206 345/440 |
| 2015/0006709 A1 | 1/2015 | Bissantz | |

(Continued)

FOREIGN PATENT DOCUMENTS

EP   1850280 A1    10/2007
WO   WO2007065195 A1 *  6/2007

OTHER PUBLICATIONS

U.S. Appl. No. 14/471,236 to Nicolas Bissantz, filed Aug. 28, 2014.

(Continued)

*Primary Examiner* — Yongjia Pan
(74) *Attorney, Agent, or Firm* — Carter, DeLuca, Farrell & Schmidt, LLP (57) ABSTRACT

A system for providing information to a user includes a screen for showing the information to the user, receiving means for receiving one or more values from a source of values on which values the information shown to the user is based, generating means for generating two or more data lines wherein each of said data lines comprises at least one data set, wherein the data sets comprise data which are based on said values and wherein the data sets are assigned to at least two data lines by predetermined or changeable criteria displaying means for simultaneously showing said two or more data lines to the user on said screen, and highlighting means for visually highlighting at least one data set out of said two or more data lines according to at least one criterion.

31 Claims, 3 Drawing Sheets

(56) References Cited

U.S. PATENT DOCUMENTS

2015/0007090 A1  1/2015  Bissantz
2015/0007091 A1  1/2015  Bissantz
2015/0121188 A1  4/2015  Bissantz
2015/0254874 A1  9/2015  Bissantz

OTHER PUBLICATIONS

U.S. Appl. No. 14/471,386 to Nicolas Bissantz, filed Aug. 28, 2014.

* cited by examiner

Fig. 1

[Figure 1 depicts a rotated screenshot of a data display interface with labeled callouts 10, 20, and 30 showing various entries such as "Dagobert tual (Umsatz)", "oCalls", "oMails", "lCalls 28", "Mails", "oVisits", "Msits", "lIrs romains", "Ofrs/Ords", "Invcs ibisch Hall", "Dwnlds SparkFont 37", "All actvs (CA)", "Web 30d", "Spl dwnlds rvices Inc." with associated data values and company names including "VEGA Grieshaber KG", "Von Roll Iscla Holding Ltd.", "Klinikum Fichtelgebirge", "MIS Austria", "Oracle D Gmb", "UBS F", "Bayer HealthCare", "LUTUM + TAPPERT DV-BE", "UBS Real Estate Kapitalanlagegesellschaft mbH", "SparkTicker Requests", "Meeting (CA)", "Netmeeting (C)", "DeltaMaster (Page Impression)", "CARNIVAL CRUISE LINES 3655 N.W."]

SYSTEM FOR PROVIDING INFORMATION TO A USER

FIELD OF THE INVENTION

The present invention refers to a system for providing information to a user.

RELATED ART

In order to display a large amount of information in a compact and intelligible form, it is known from the prior art to use so-called sparklines which are word-sized, minimized diagrams. Sparklines provide dense information in small spaces and do not necessitate a complex and time-consuming loading of databases and calculation of reports by the user. For example exchange rate movements, sports results, temperature variations etc. may easily be illustrated by use of such word-sized graphics.

It is also known to provide a single data line comprising a plurality of data sets which are moving over the screen of a computer. Such data lines increase the amount of displayed information and the movement of the data sets allows providing the user with a lot of current information without user-interaction. The displayed information may be updated so as to provide the user permanently with current information. The data sets comprised in such a data line can also comprise sparklines. Such data ticker based on sparklines help recognizing problems or developments easily and quickly so that suitable action can be taken for example by a financial analyst or controller in due course if necessary.

It is known from U.S. Pat. No. 8,122,369 issued for the same applicant, which is incorporated into this application in its entirety by reference, to display at least two such data lines simultaneously to the user, in order to increase the information shown to the user.

BRIEF SUMMARY OF THE INVENTION

It is the object of the present invention to provide an improved system for providing information to a user.

In order to solve this object, the system according to the present invention comprises a screen for showing information to the user and receiving means for receiving one or more values from a source of values on which the information shown to the user is based. Said values are for example results of sporting events, business data, such as turnover values, sales values, stock prices, economic values such as unemployment data etc. The screen may be a screen of any kind of computer device. The screen may be the screen of a portable device, such as a cell phone or laptop or of a personal computer. The system further comprises generating means for generating two or more data lines wherein each of said data lines comprises at least one data set, wherein the data sets comprise data which are based on said values. In accordance with the invention the data sets are assigned to one or more of the at least two data lines by predetermined or changeable criteria. The system according to the invention further comprises displaying means for simultaneously showing said two or more data lines to the user on said screen.

The system allows the simultaneous display of two or more and preferably of a plurality of data lines which each are composed of at least one data set, and which are preferably each composed of a plurality of data sets. The data sets comprise data which are based on the values from a source of values. This allows to give a perfect overview even of complex processes due to the ability to display at least two data lines which may be sorted by suitable criteria such as for example turnovers, yields, losses, number or kind of orders, calls, mails, history of any process, information about related products, competitors, customers or any other activity for example of different departments or sections of a company. Based on this condensed information it is easily possible for the management, for a controller or for a financial analyst to detect not desired trends and to take action in due course.

Due to the fact that the displaying means are adapted to display two or more than two data lines simultaneously it is not only possible to provide a lot of information to the user but also to easily compare the data lines with each other and also to display the result of such comparison in a further data line. The two or more than two data lines may displayed one below the other, side by side or may have any other desired orientation on the screen.

The information may be displayed on a screen of a personal computer or laptop or on a screen of a navigation system or of a handheld portable device, such as a cell phone, PDA etc.

In a first embodiment, the system may comprise highlighting means for visually highlighting at least one data set out of said two or more data lines according to at least one criterion. Thereby, the user will be provided with additional information that is easily recognized. The highlighting means may automatically apply the criterion in order to determine whether the at least one data set is highlighted and/or in what manner the at least one data set is highlighted.

In a particular embodiment, the system may comprise comparison means for comparing the data comprised in the at least one data set with predetermined or changeable values.

Further, in one embodiment, the highlighting means will highlight a data set depending on the result of the comparison means comparing the data comprised in data set with predetermined or changeable values. The highlighting means will thereby provide the user with additional information with respect to the data sets comprised in the highlighted area depending on a comparison of these data sets with predetermined or changeable values.

In a particular embodiment, the comparison means will compare the data comprised in the at least one data set with benchmark values. Thereby, the additional information provided to the user will be information with respect to the difference between the data sets that are displayed, and benchmark values.

In a particular system, the benchmark values are generated by benchmark generating means on the basis of historical data or external data.

In particular, the comparison means may compare the at least one data set with historical data, for example an average value, a minimum or a maximum value of the data set a certain time in the past, or with external benchmarks. For example, if the data sets relate to a recent time period, the benchmark values may be the same data set for a past time period. For example, the comparison means may compare the actual values with the values of the last week, the last month, the last quarter year or the last year.

In a particular embodiment, the highlighting means will highlight the at least one data set in at least two different ways depending on the at least one criterion. Thereby, further information can be provided to the user.

In particular, the highlighting means will highlight the at least one data set using at least two different color tones depending on the at least one criterion. Further, the highlighting means may highlight the at least one data set using at least two different color shades depending on the at least one criterion. Further, the highlighting means may also highlight the at least one data set using at least two different color tones and at least two different color shades.

For example, the highlighting means may use two different color tones such as red and blue depending on the at least one criterion, and/or at least two different color shades like a light color and a dark color depending on the at least one criterion, such as a light red and a dark red or a light blue and a dark blue.

In a particular embodiment, the highlighting means will highlight the at least one data set using two different color tones depending on whether the comparison means will provide a positive or a negative result of the comparison. For example, if the data sets are above a certain benchmark value, they may be highlighted in a first color tone, such as green, while the same data sets may be highlighted in a second color tone, for example in red, if they are below a certain benchmark value.

In a further embodiment, the highlighting means will highlight the at least one data set using different color shades of the same color tone if the comparison means will provide results having the same sign, but different absolute values. For example, if the data set is strongly above or below a benchmark value, a strong color shade may be used, while a weak color shade is used if the data sets are only slightly above or below a certain benchmark value.

The highlighting means may highlight several data sets comprised in a data line separately. In this case, the criterion is preferably applied to the data sets separately in order to determine whether a data set is highlighted and in order to determine the manner of highlighting.

Alternatively, the highlighting means may highlight all the data sets comprised in a data line together, or may highlight an entire data line. In this case, the criterion is preferably applied to all the data sets comprised in the data line, or data generated from all the data sets.

The highlighting means of the present invention may not only be used in systems for showing at least two data lines, but also in systems showing at least one data line, such as a system showing a single data line.

The present invention further comprises a system for providing information to a user comprising: a screen for showing the information to the user, receiving means for receiving one or more values from a source of values on which values the information shown to the user is based, generating means for generating at least one data line wherein the data line comprises at least one data set, wherein the data sets comprises data which are based on said values, and displaying means for showing said at least one data line to the user on said screen. The system further comprises highlighting means for visually highlighting at least one data set out of said at least one data line according to at least one criterion.

The highlighting means for such an embodiment may be composed and work in the same way as described above with respect to the system showing at least two data lines.

In a second embodiment, the system further comprises moving means for moving at least one of said data lines on the screen.

The moving means further comprise adjustment means for adjusting the speed of the movement of the at least one data line depending on a criterion relating to the at least one data set comprised in the data line. The adjustment means may automatically apply the criterion to the at least one data set comprised in the data line in order to automatically set the speed of movement of the data line.

In particular, the movement means may move the data sets comprised in a data line with a speed that is determined by the adjusting means depending on a criterion relating to these data sets.

Thereby, depending on the data sets comprised in the data lines, a first data line may be moved with a first speed, while a second data line is moved with a second speed. In particular, the data sets comprised in a first data line may be moved with a first speed, and the data sets comprised in a second line may be moved with a second speed.

In a particular embodiment, the criterion may relate to a number of data sets comprised in the at least one data line. In a further embodiment, the criterion may also relate to the size of the at least one data set, and in particular to the size of the representation of the data set.

In an embodiment, the criterion may relate to the size of the data set in the direction of movement of the data line. The criterion may also relate to both the number of data sets comprised in the at least one data line, and the size of these data sets. In particular, the criterion may relate to the size necessary for displaying all the data sets comprised in the data line.

In a particular embodiment, the adjusting means will adjust the speed in such a way that a data line comprising a larger number of data sets or larger data sets will move faster than a data line comprising a smaller number of data sets or smaller data sets.

Further, the adjusting means may adjust the speed in such a way that a data line comprising data sets which need more space to be displayed will move faster than a data line comprising data sets which need less space to be displayed.

Thereby, the speed of movement will depend on the size of the information displayed in the data line, and in particular of the size of this information in the direction of movement of the moving means.

In a particular embodiment, the moving means may move the data sets in one data line in such a way that the same sequence of data sets is repeatedly shown to the user. In particular, the data sets may be moved on the screen in such a way that sets moving over a boarder of the data line will disappear and after a certain time reappear over the opposing boarder of the data line into the data line.

Without the adjustment means, the time for displaying a complete set of data at least once would very massively depend on the number of data sets to be displayed in the data line and the size of these data sets. With the present invention, this difference can be reduced. Further, the speed of the movement will give the user immediate information on the number of data sets or their size comprised in one data line.

In a particular embodiment of the present invention, the data lines may comprise labels. Further, the moving means may be programmed in such a way that the labels of the data lines are not moved.

Further, the moving means may be programmed in such a way that only those data lines that are not fitting onto the screen will be moved, whereas data lines which are fitting onto the screen are not moved. In particular, if all the data sets to be displayed in a data line can be shown on the screen without moving the data sets, the data sets are not moved.

The moving means of the present invention comprising the adjustment means for adjusting a speed of the movement of the at least one data line depending on a criterion may not only be used in systems for showing at least two data lines, but also in systems showing at least one data line, such as a system showing a single data line.

The present invention further comprises a system for providing information to a user comprising: a screen for showing the information to the user, receiving means for receiving one or more values from a source of values on which values the information shown to the user is based, generating means for generating at least one data line wherein the data line comprises at least one data set, wherein the data sets comprises data which are based on said values, and displaying means for showing said at least one data line to the user on said screen. The system further comprises moving means for moving the at least one data line on the screen, wherein the moving means comprise adjustment means for adjusting a speed of the movement of the at least one data line depending on a criterion relating to the at least one data set comprised in the data line.

The moving means and the adjustment means for such an embodiment may be composed and work in the same way as described above with respect to the system showing at least two data lines.

It is of particular advantage if at least one of the data sets forming the data lines comprises sparklines. As mentioned above sparklines are word-sized graphics which display a large amount of information in a small space. The sparklines may contain vertical or horizontal bar diagrams or line diagrams etc. showing for example the development of any desired value over time, i.e. the history of a parameter of interest. The data lines may also comprise other data such as text and a combination of text and values such as for example the number of incoming calls from a particular customer or from several customers.

At least one data line may comprise a label designating the kind of data of which the data line is comprised. Such labels designate the data line and easily show to the user which kind of data are displayed in the data line. Such labels are optional and can be omitted if the nature of the displayed data is self explaining. However, the labels ease the orientation of the user by clearly designating the kind of data of which the data lines are composed.

The values which are the basis of the data may be textual or numerical values. The values may be for example listed in one or more tables or may be included in one or more text documents such as reports.

In accordance with a further aspect of the invention the data may be uploaded to an internet or intranet web server and then integrated into an internet or intranet web page. Alternatively the system is adapted to provide the information to the user independently from the internet or intranet. The system may thus also be a "desktop version" which may be started without interaction with the internet or intranet and which provides the information on the screen of a computer or on the screen of a handheld device such as a PDA. If the device is a portable device it is possible to provide the user of the system at any location with the desired information.

It is of particular advantage if the system comprises moving means for moving at least one of said data lines on the screen. The movement of the data lines allows providing a large amount of information to the user without requiring user interaction. It is possible to adapt the system so that user action is not necessary for providing the information but possible to provide the user with additional information.

In accordance with a further embodiment of the invention it is conceivable that the system comprises moving means for moving only those data lines which are not fitting onto the screen whereas data lines which are fitting onto the screen are not moved. It is of course also possible to move all data lines or to provide a system in accordance to which no data line is moved.

Preferably the labels designating the data lines are not moved on the screen. In accordance with this embodiment of the invention preferably the labels forming the first row or line of the data field are not moved while the data lines themselves may be moved over the screen. Such movement may for example be a horizontal or vertical movement over the screen.

The system may comprise a database in which said values are stored wherein the database is connected or connectable to said receiving means for receiving the values from the database. The database may be part of the system or may be an external data source, database or web service to which the receiving means for receiving data may be connected. The database may comprise text files and/or data files.

In accordance with a further embodiment of the invention the system comprises update means which are adapted to trigger an update of the data on a regular basis, on demand by the user or automatically, e.g. if any of said values changes. This allows to provide the user permanently with current data and allows an immediate reaction if a not desired trend or not desired values are detected.

The generating means of the system are adapted to generate the data as text or as graphic, such as a vector-based graphic or as a bitmap.

As outlined above the system may allow the upload of the data by uploading means to an internet web server by FTP, by file copy or by HTTP or SMTP. The web page on which the data lines are displayed may be a XML, HTML web page, a XHTML web page or a web page including a flash or java application.

In accordance with a further embodiment the system comprises selecting means for selecting the data and/or the kind of data and/or the kind of visualization of data, such as color, size and the legend of the data, by the user of the system or by the provider of the system, which data are used for generating the data lines. It is conceivable that only a part of the values which are available are of relevance for the requested information so that the user or the provider of the system can select this part of the values for generating data lines.

It is also possible for the user to select color and/or the size of the displayed data as well as legends representing for example a designation of the displayed data, the figures underlying the displayed data or the kind of the displayed data.

In order to further increase the amount of information shown to the user the system may comprise detail displaying means for showing details referring to the data shown on the screen. These detail displaying means may be adapted to provide size adjustments for depicting more details such as additional labels as well as relative and absolute values or value changes referring to the displayed data.

The detail displaying means may also be adapted to dynamically enlarge the distance between graphical elements of the data set in order to place values or value labels into the generated space. If for example a particular column or bar of a sparkline is of interest it is possible to increase the space on both sides of this column or bar and to provide the user with additional information in this space as for example absolute values or relative values showing the relation of the selected column/bar to the previous or succeeding column/bar etc.

The system further may comprise adjusting means for adjusting the movement, such as direction and/or speed of movement of the data lines on the screen.

Said detail displaying means and/or said adjusting means may be triggered by moving on the screen a pointer to said data or by touching on a touch screen the location on which the data are displayed on the screen.

The screen may be the screen of a portable device or of a personal computer or laptop. The portable device may be a handheld device such as a cell phone or a PDA. As outlined above the screen may be a touch screen which allows easy user interaction.

The information shown on the screen may be displayed in form of a window or frame. This window or frame may be adjusted in size and position so that the work with the computer or device can be continued at the same time as the data lines are shown on the screen. Thus the present invention is a valuable tool in particular for persons who wish to have a full and clear overview over any process of interest, such as controllers, financial analysts, managers etc.

Further embodiments and advantages of the invention are described by the embodiment which is shown in the figures.

BRIEF DESCRIPTION OF THE DRAWINGS

FIGS. 2 and 3 show the invention in form of data lines which are located in a frame or window ("ticker portal") opening on the screen of a computer device.

DETAILED DESCRIPTION OF THE INVENTION

The following explanation of the embodiment applies to all figures.

The system comprises a computer screen of a common personal computer or laptop for showing the information to the user.

The system further comprises a database which stores textual or numerical values. Such textual values are for example the name of the customers, the name of the ordered products etc. Numerical values are for example turnover values vs. time.

The values are stored in a database which is accessed by receiving means of the system of the present invention. The receiving means are adapted to read or receive from the database values which are the basis for generating data lines.

After receipt of the values the receiving means transfers the values to the generating means of the system. The generating means generate data from the values such as sparklines and/or textual information and form data sets 20 comprising said data. One or usually more than one data set 20 is assembled into a data line 10 which comprises one or preferably two or more data sets 20 in a row.

The receiving means further receive labels 30 from the database which labels designate the kind of the data displayed in each of the data lines 10. These labels 30 form the first column or line of the shown data lines 10.

The data lines 10 usually move horizontally over the screen. However, the invention covers also any other kind of movement such as a vertical movement of data lines for example at one side of the screen. Contrary to the data lines 10 the labels 30 are preferably not moved by the moving means of the system.

The moving means are adapted to move the data lines 10 on the screen so that the user may be provided with a lot of information without the requiring user interaction.

In one embodiment, the speed of the movement of a data line depends on the content displayed in the data line, and in particular to a criterion relating to the data sets 20 comprised in a data line 10.

In particular, the moving means may comprise adjusting means for adjusting the speed of the movement depending on the length of all the data sets to be displayed in a data line in the direction of movement. Therefore, if a data line comprises a large number of data sets or very large data sets, the adjustment means will increase the speed, because there is a lot of information to be displayed in the data line, and decrease the speed if there is not so much information.

In particular, if the size of the information to be displayed in a data line is only slightly larger than the size of the data line, such that the entire information does not fit completely on the screen but is only slightly larger than an information that would fit onto the screen, the adjustment means may use a first, rather low speed of movement.

In contrast, if the size of the information is far larger than the information that would still fit onto the screen, a second, higher speed may be used.

The adjustment means may adjust the speed in a stepwise manner, with at least two different speeds, and in certain embodiments with a plurality of different speeds. Alternatively, the adjustment means may adjust the speed continuously with the size of the data to be displayed in a data line.

As outlined above, the generating means are provided to generate data lines 10 based on values of a database. As shown in the figures the data lines 10 comprise sparklines which have the shape of vertical bar diagrams, line diagrams etc. reflecting the development of a value over time. The data lines 10 also comprise textual information such as the name of customers or the name of products as shown in the figure. This textual information is linked with numerical values such as the number of calls of the customers or the number of product downloads.

As shown in the figures the system of the present invention allows the representation of a number of data lines 10, each of the data lines 10 reflecting a certain category of the displayed data. In the shown example these categories which are designated by the labels 30 in the first row are turnover, outgoing and incoming calls, mails, visits, orders, downloads etc. Moved data lines 10 are located beside the labels 30 wherein the data lines 10 are composed of data sets 20. The data sets 20 are comprised of data which data reflect values of the labeled category.

Figure 1:
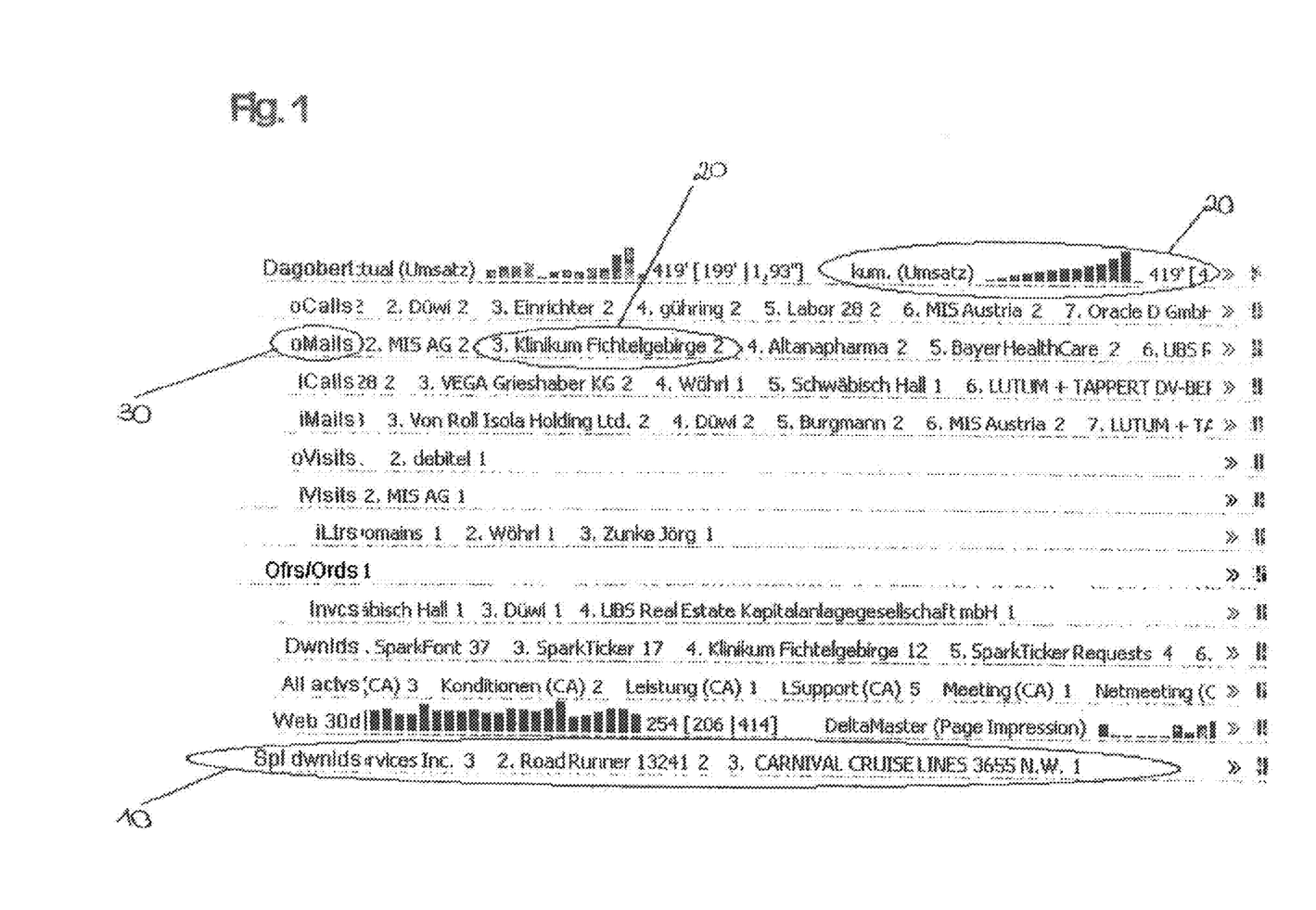
FIGS. 1 to 3 show snapshots of a computer screen of the system according to the present invention.
Figure 2:
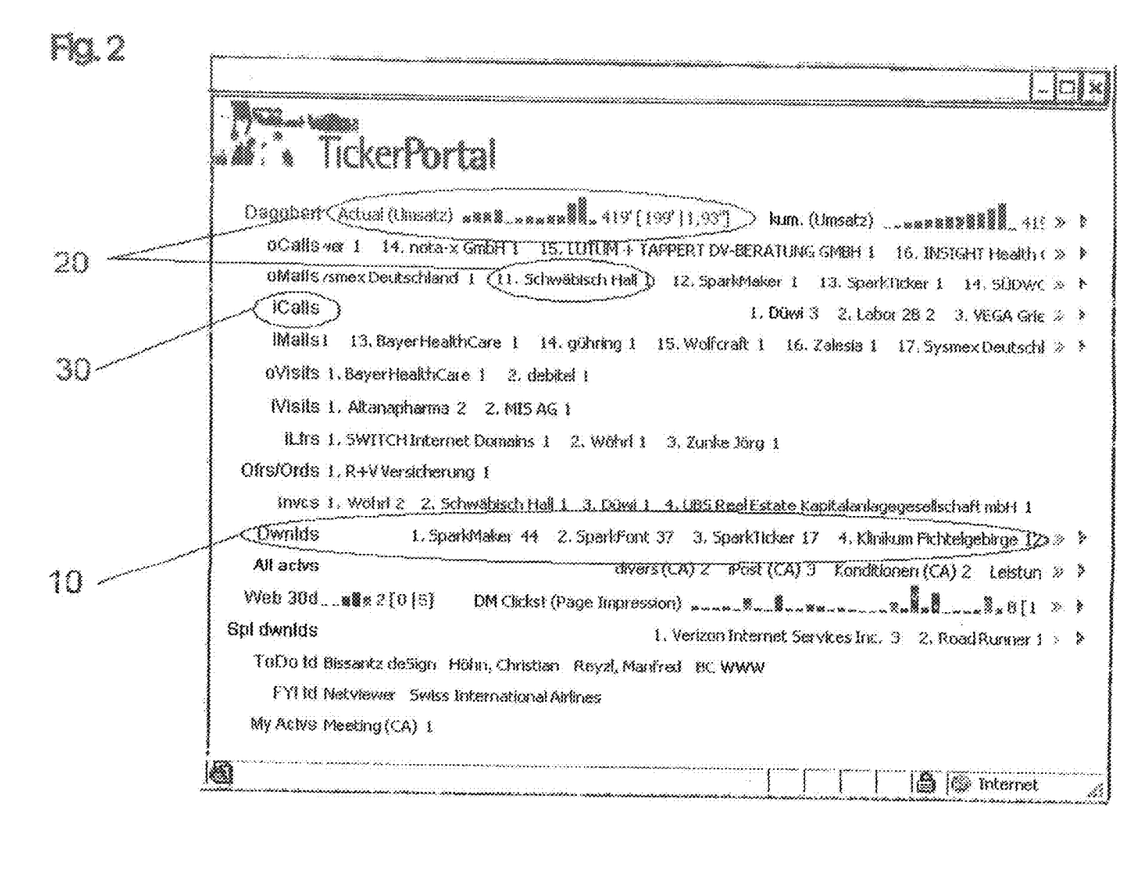

As shown in the first line of the enclosed figures the data may comprise sparklines which show the development of the turnover versus time for different companies or departments or sections of a company. Reference numeral 20 in the first line in FIG. 2 depicts a full data set 20 comprising a textual information, namely the turnover, a graphical information in form of a sparkline and numerical values on which some of the columns of the sparklines are based. The first, second and third number on the right-hand side of the vertical bar diagram of the sparkline reflect the value on which the last column (current value), the smallest column (minimum value) and the largest column (maximum value) of the sparkline is based, respectively. Because the most current value is depicted both numerically and graphically, the eye is capable of safely measuring the magnitude of the unlabeled values.

A label designating the sparkline is located on the left-hand side of the vertical bar diagram of the sparkline. This label, the bar diagram as well as said numbers form a data set 20. Of course other kinds of representation such as line diagrams as well as other values describing the diagram, such as mean values, deviations, absolute and relative values etc. are also conceivable to be displayed.

As shown in the second and third data line 10 of the figures the data lines have not to comprise graphical elements but can also contain textual information. In this example the second line is a data line which shows the number of outgoing calls to different firms. The data line 10 comprises the name of the company, on the right hand side thereof the number of outgoing calls to this company and on the left hand side the ordinal number of the respective company wherein the ordinal number is based on the number of outgoing calls.

The third and the following data lines 10 represent further data such as outgoing mails, calls etc.

The present figures of course merely contain examples of data forming the data sets 20. The present invention may be used for any kind of data such as for example for results of sport events, any kind of company data such as personnel or economic data etc. There is no restriction as to the kind of data and to the kind of representation of these data which may be shown in those data lines 10.

The system according to the embodiment shown in the figures may have additional tools which allow a comfortable use of the data lines 10.

On of these tools is a means for stopping the movement of a data line 10 which eases inspecting the data set 20. This stopping means may be triggered by moving a pointer to the data set 20 or data line 10 of interest or by touching on a touch screen the respective position on the screen.

Another tool is designed to show more details of a data set 20 to the user. This tool may be adapted to represent additional figures referring to a data line 10 or data set 20 or data such as relative or absolute values, changes or deviations of the data line 10 or further information referring to a company to which the data set 20 belongs etc. The tool may be adapted to create a space in a data set 20 in which the additional data are shown. Such space may be created for example on one or both sides of a column of a sparkline or beside the text of a data set.

In a further embodiment of the invention tools are provided for adjusting the size, color or form of the representation of the data. It is for example conceivable to provide selecting means for allowing the user to select the kind of sparkline which is represented in a data set 20.

The data lines 10 may be shown in a frame or window ("ticker portal") opening on the screen which is shown in FIG. 2.

The window may be located on the screen at a fixed location, such as on top of the screen or may be moved on the screen according to the users need. This allows the user to continue his current work on the screen and at the same time gives to the user without user interaction permanently the desired information in form of said data lines 10. Preferably the size of the window may be adjusted according to the users need for example so that it perfectly fits on the screen. Such size adjustment may be accompanied by a corresponding scale up or scale down of the data lines 10 so as to maintain the amount of displayed information independently of the size of the window.

Figure 3:
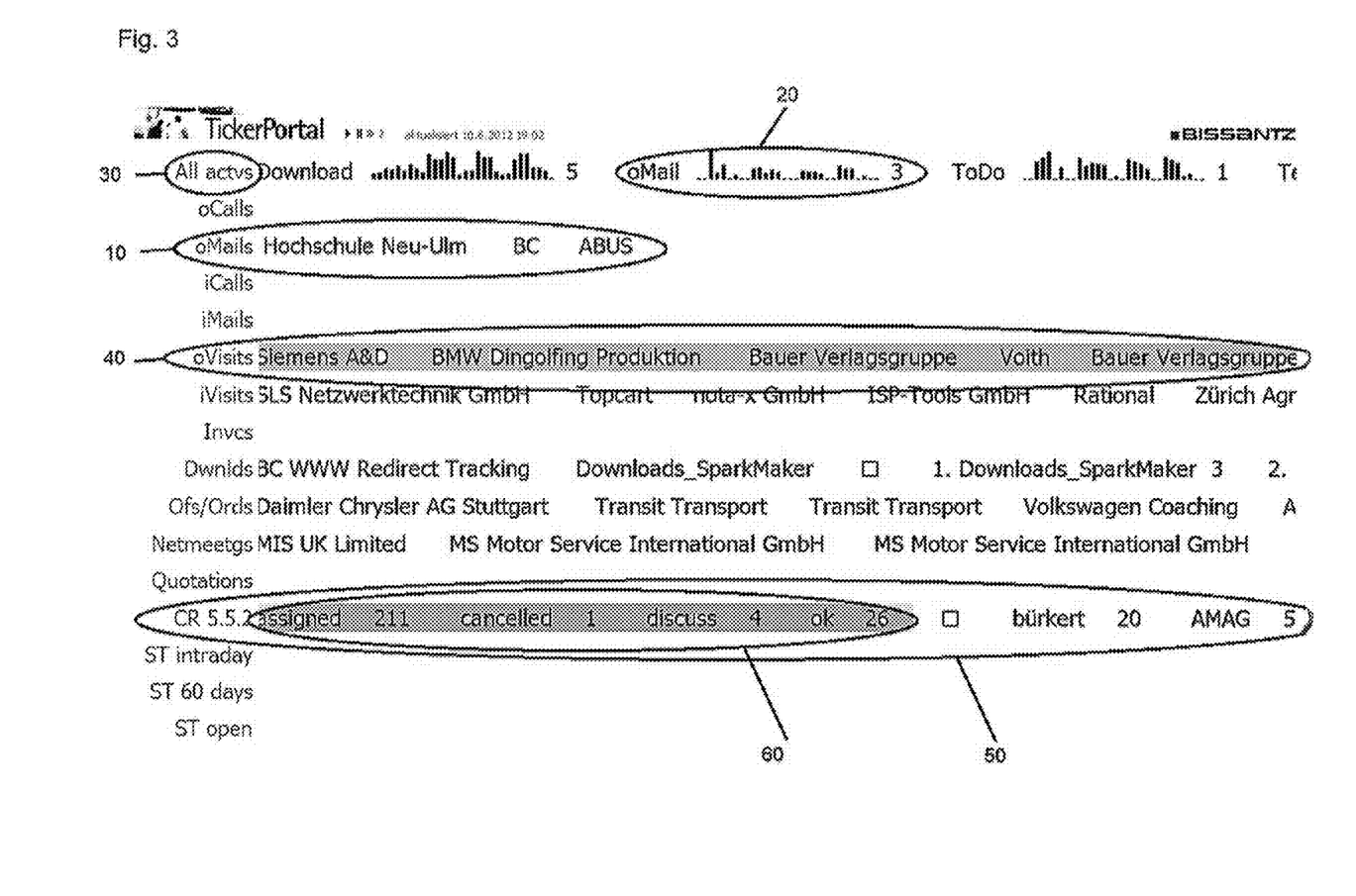

FIG. 3 shows a further tool for providing the user with additional information. This tool will highlight at least some of the data sets or data lines according to at least one criterion.

For this purpose, the highlighting means may comprise comparison means for comparing the data comprised in the at least one data set with predetermined or changeable values. In particular, the values of the data sets may be compared with benchmark values. For example, if the data set relates to the number of visits to customers in the running month, this value may be compared with the average value in past months.

The highlighting means may highlight the data line in a first color, such as red, if the displayed values are below the benchmark values. In contrast, if the displayed values are above the benchmark values, the highlighting means may highlight the data line with a second color, such as blue.

In particular, the background of a data set or a data line may be highlighted in a different color tone depending on whether the data displayed are above or below a certain benchmark value.

The absolute difference between the data sets and the benchmark values may also have an influence on the intensity of the color. Light colors may represent small differences with respect to benchmark values, while strong color shades may represent strong differences.

In FIG. 3, a first data line 40 is highlighted in light blue, representing a value of visits that is slightly larger than the benchmark value.

In contrast, line 50 is highlighted in light red, indicating a value that is slightly lower than the benchmark value.

The highlighting means may highlight the entire data line depending on the comparison of all the data sets comprised in the data line with a benchmark value.

Alternatively, the highlighting means may highlight the data sets within a data line separately. In this case, the data sets or a group of data sets of a single data line will be separately compared with benchmark values.

In this case, first data set comprised in a first data line may be highlighted with a different color than a second data set comprised in the same first data line, depending on the difference of these data sets with respect to certain benchmark values.

What is claimed is:

1. System for providing information to a user comprising:
a screen for showing the information to the user,
receiving means for receiving one or more values from a source of values on which values the information shown to the user is based,
generating means for generating two or more data lines wherein each of said data lines comprises at least one data set, wherein the data sets comprise data which are based on said values and wherein the data sets are assigned to at least two data lines by predetermined or changeable criteria,
comparison means for comparing data comprised in the at least one data set with predetermined or changeable values, wherein the comparison means will compare the data comprised in the at least one data set with benchmark values, wherein the benchmark values are generated by benchmark generating means on the basis of historical data or external data,
displaying means for simultaneously showing said two or more data lines to the user on said screen, and
highlighting means for visually highlighting at least one data set out of said two or more data lines according to at least one criterion, wherein the highlighting means will highlight the at least one data set in at least two different ways as compared to unhighlighted data sets depending on the at least one criterion, wherein values above the benchmark values are highlighted at least one way and values below the benchmark are highlighted at least one other way.

2. System according to claim 1, wherein the highlighting means will highlight a data set or a data line depending on the result of the comparison means comparing the data comprised in the at least one data set of said data line.

3. System according to claim 1, wherein the highlighting means will highlight the at least one data set using at least two different colour tones and/or at least two colour shades depending on the at least one criterion.

4. The system according to claim 2 or 3, wherein the highlighting means will highlight the at least one data set using two different color tones depending on whether the comparison means will provide a positive or negative result of the comparison.

5. The system according to claim 2 or 3, wherein the highlighting means will highlight the at least one data set using different color shades of the same color tone if the comparison means will provide a result having the same sign, but different absolute values.

6. System according to claim 1, comprising moving means for moving at least one of said data lines on the screen.

7. System according to claim 6, wherein the moving means comprise adjustment means for adjusting a speed of the movement of the at least one data line depending on a criterion relating to the at least one data set comprised in the data line.

8. System according to claim 7, wherein the criterion relates to a number of data sets comprised in the at least on data line and/or the size of the at least one data set.

9. System according to claim 8, wherein the adjusting means will adjust the speed in such a way that a data line comprising a larger number of data sets or larger data sets will move faster than a data line comprising a smaller number of data sets or smaller data sets.

10. System according to claim 1, wherein the labels of the data lines are not moved.

11. System according to claim 1, wherein the system comprises moving means for moving only those data lines which are not fitting onto the screen whereas data lines which are fitting onto the screen are not moved.

12. System according to claim 1 wherein at least one of the data sets comprises sparklines.

13. System according to claim 1, wherein at least one data line comprises a label designating the kind of data of which the data line is comprised.

14. System according to claim 1, wherein said values are textual or numerical values.

15. System according to claim 1, wherein the system comprises uploading means for uploading said data to an internet or intranet web server and integrating means for integrating said data within an internet or intranet web page.

16. System according to claim 15, wherein said uploading means are adapted to perform said upload of the data to the internet web server by FTP, by file copy or by HTTP or SMTP.

17. System according to claim 15, wherein the web page is a XML, HTML web page, a XHTML web page or a web page including a flash or java application.

18. System according to claim 1, wherein the system is adapted to provide the information to the user without requiring access to the intranet or internet.

19. System according to claim 1, wherein the system comprises a database in which said values are stored wherein the database is connected or connectable to said receiving means for receiving the values from the database.

20. System according to claim 1, wherein the system comprises connection means for connecting the receiving means to an external datasource, database or webservice in which said values are stored.

21. System according to claim 19 or 20, wherein the databases comprise text files and/or data files.

22. System according to claim 1, wherein the system comprises update means which are adapted to trigger an update of the data on a regular basis, on demand by the user or automatically, e.g. if any of said values changes.

23. System according to claim 1, wherein the generating means are adapted to generate the data as text or as graphic representation, such as a vector-based graphic or as a bitmap.

24. System according to claim 1, wherein the system comprises selecting means for selecting the data, kind of data or kind of visualization of data, such as color, size and the legend of the data, by the user of the system or by the provider of the system, which data are used for generating the data lines.

25. System according to claim 1, wherein the system comprises detail displaying means for showing details referring to the data shown on the screen.

26. System according to claim 25, wherein the detail displaying means are adapted to provide size adjustments for depicting more details such as additional labels as well as relative and absolute values or value changes.

27. System according to claim 5, wherein the detail displaying means are adapted to dynamically enlarge the distance between graphical elements of the data in order to place values or value labels into the generated space.

28. System according to claim 1, wherein the system comprises adjusting means for adjusting the movement, such as direction and/or speed of movement of the data lines on the screen.

29. System according to any one of claims 25 to 28, wherein said detail displaying means and/or said adjusting means are triggered by moving on the screen a pointer to said data or by touching on a touch screen the location on which the data are displayed on the screen.

30. System according to claim 1, wherein the screen is a touch screen.

31. System for providing information to a user comprising:
 a screen for showing the information to the user,
 receiving means for receiving one or more values from a source of values on which values the information shown to the user is based,
 generating means for generating at least one data line wherein the data line comprises at least one data set, wherein the data sets comprises data which are based on said values,
 comparison means for comparing data comprised in the at least one data set with predetermined or changeable values, wherein the comparison means will compare the data comprised in the at least one data set with benchmark values, wherein the benchmark values are generated by benchmark generating means on the basis of historical data or external data,
 displaying means for showing said at least one data line to the user on said screen, and
 highlighting means for visually highlighting at least one data set out of said at least one data line according to at least one criterion, wherein the highlighting means will highlight the at least one data set in at least two different ways as compared to unhighlighted data sets depending on the at least one criterion, wherein values above the benchmark values are highlighted at least one way and values below the benchmark are highlighted at least one other way.

* * * * *